(12) United States Patent
Gehring et al.

(10) Patent No.: US 7,098,564 B2
(45) Date of Patent: Aug. 29, 2006

(54) WORK PIECE

(75) Inventors: Andreas Gehring, Buehl (DE); Roland Bohn, Buehl (DE); Peter Mueller, Lautenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,351

(22) PCT Filed: Feb. 6, 2002

(86) PCT No.: PCT/DE02/00420

§ 371 (c)(1),
(2), (4) Date: Dec. 15, 2003

(87) PCT Pub. No.: WO02/073777

PCT Pub. Date: Sep. 19, 2002

(65) Prior Publication Data

US 2004/0074077 A1    Apr. 22, 2004

(30) Foreign Application Priority Data

Feb. 21, 2001    (DE) .............................. 101 08 192

(51) Int. Cl.
*H02K 21/26*    (2006.01)
(52) U.S. Cl. ................... 310/154.08; 310/42; 310/89; 310/154.03; 310/156.12

(58) Field of Classification Search .............. 310/42, 310/89, 154.03–154.09, 154.12–156.14, 310/156.26; 29/592
See application file for complete search history.

(56) References Cited

U.S. PATENT DOCUMENTS

| 2,756,356 | A | * | 7/1956 | Brownlee et al. ........... 310/153 |
| 3,567,973 | A |   | 3/1971 | Rhoads ........................ 310/42 |
| 3,581,394 | A | * | 6/1971 | Phelon .................... 310/156.31 |
| 3,663,850 | A | * | 5/1972 | Phelon ........................ 310/153 |
| 4,434,546 | A | * | 3/1984 | Hershberger ................. 29/598 |
| 4,636,107 | A | * | 1/1987 | Casler et al. ................ 411/477 |
| 4,745,319 | A | * | 5/1988 | Tomite et al. ........... 310/154.26 |
| 4,800,309 | A | * | 1/1989 | Lakin ........................... 310/90 |
| 4,859,892 | A | * | 8/1989 | Shiroyama .................. 310/218 |
| 4,877,984 | A |   | 10/1989 | Colwell ........................ 310/66 |
| 5,264,749 | A | * | 11/1993 | Maeda et al. ........... 310/154.07 |
| 5,297,471 | A |   | 3/1994 | Boehm ........................ 92/98 R |

* cited by examiner

Primary Examiner—Dang Le
(74) Attorney, Agent, or Firm—Ronald E. Greigg

(57) ABSTRACT

A work piece according to the invention has caulking tabs that are connected to each other by means of a bridge piece. As a result, the caulking tabs are lengthened, thus permitting better control of the caulking process because the caulking tabs overlap a component better.

12 Claims, 2 Drawing Sheets

WORK PIECE

CROSS-REFERENCE TO RELATED APPLICATIONS

This application is a 35 USC 371 application of PCT/DE 02/00420 filed on Feb. 6, 2002.

BACKGROUND OF THE INVENTION

1. Field of the Invention

The invention is directed to a work piece of plastically deformable material and having caulking tabs.

2. Description of the Prior Art

In the manufacture of sheet metal parts, e.g. for pole housings of electric machines, particularly of small-power electric motors, when the sheet metal is punched, two opposing caulking tabs are produced, which in the final assembly of the pole housing, produce a connection between the pole housing and a component, e.g. a transmission housing, by being radially caulked against the transmission housing.

A minimal punching width between the caulking tabs, which among other things, limits a length of the caulking tabs, depends on the sheet metal thickness. The thicker the sheet metal, the greater the minimum producible punching width. The shorter the caulking tab to be bent, the smaller the overlap between the caulking tab and the component.

The smaller a radial caulking stroke required to caulk the caulking tabs, the greater the sensitivity to component tolerances of the pole housing or the component, which makes the caulking process difficult to control.

SUMMARY AND ADVANTAGES OF THE INVENTION

The work piece according to the invention has the advantage over the prior art of improving the controllability of the caulking process in a simple way.

A length of the caulking tabs is increased by half the minimum punching width, which allows a greater sheet metal thickness to be used for the lamination bundle. The use of the pole housing as a magnetic yoke produces an improved magnetic yoke. In addition, a greater sheet metal thickness produces greater axial holding forces between the pole housing and the component. Furthermore, the lengthening of the caulking tabs results in a greater overlap on the transmission housing, as a result of which the connection of the sheet metal and the components is less sensitive to tolerances of the lamination bundle or of the component since less of a caulking stroke is required.

It is advantageous if a bridge piece between the caulking tabs functions as a desired breaking point since this advantageously produces a tapering of the caulking tabs at their free ends and then advantageously functions as an assembly bevel, together with the bevel advantageously provided on the component.

The work piece is advantageously comprised of a sheet metal or a sheet metal laminate.

The work piece can advantageously be a pole housing that is then connected to a transmission housing of an electric machine.

BRIEF DESCRIPTION OF THE DRAWINGS

An exemplary embodiment of the invention is described herein below, with reference to the drawings, in which:

FIG. 3b shows a top view of the work piece shown in FIG. 3a.

DESCRIPTION OF THE PREFERRED EMBODIMENT

Figure 1A:
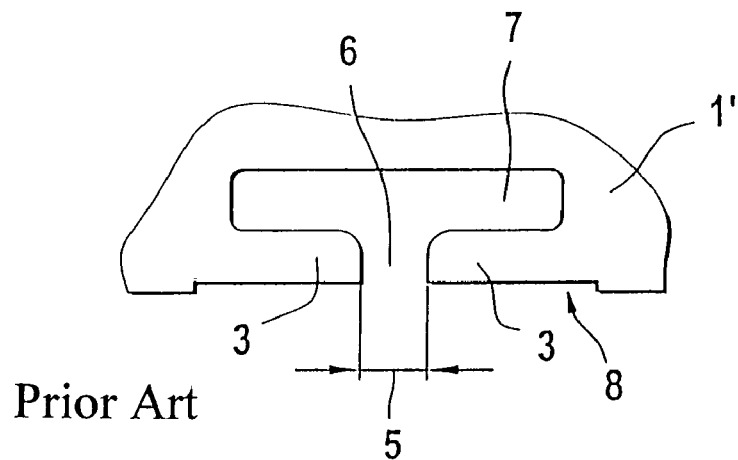
FIG. 1a shows a work piece according to the prior art.

FIG. 1a shows a work piece 1' according to the prior art. The work piece 1' is comprised of a plastically deformable material, e.g. a metal. The work piece 1' can in particular be comprised of a sheet metal or a sheet metal laminate. For example, an opening 7 is first punched out of the work piece 1'. The cross section of the opening 7 can be of any shape; in this exemplary embodiment, it is rectangular. In a subsequent production step or at the same time as the opening 7 is being produced, the opening 7 is opened out toward the edge 8 of the work piece 1' in the form of a passage 6. A minimal punching width 5 is required for this passage 6. In the process of this, two caulking tabs 3 are produced on the work piece 1', which border the opening 7 on both sides of the passage 6 on the side oriented toward the edge 8. These caulking tabs 3 can be bent, for example perpendicular to the plane of the drawing.

The minimal punching width 5 between the caulking tabs 3, which defines the length of these caulking tabs 3, depends on the sheet metal thickness. The thicker the sheet metal, the greater the minimal punching width resulting from the punching die.

Figure 1B:
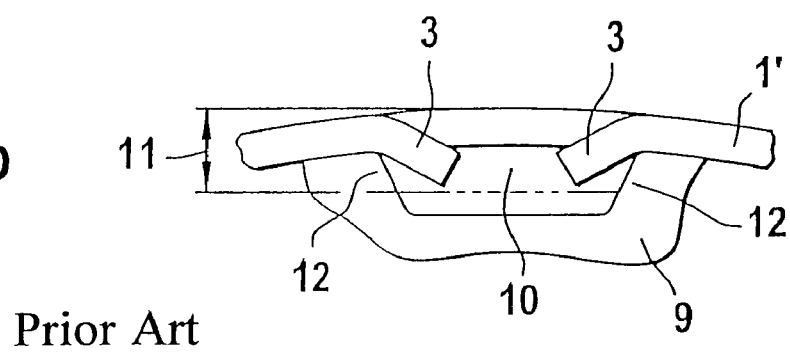
FIG. 1b shows a work piece according to the prior art that is caulked to a component.

FIG. 1b shows a work piece 1' according to the prior art that rests against a component 9 and is attached to it. In the region in which the caulking tabs 3 of the work piece 1' are disposed, the component 9 has a groove 10 with side walls 12 that are inclined toward each other so that the caulking tabs can be bent inward toward the side wills 12, into the groove 10 of the component, and can be caulked there, for example. A particular caulking stroke 11 is required to accomplish this. The more powerful the caulking and therefore the attachment of the work piece 1' to the component 9 is intended to be, the further the caulking tabs 3 must be bent into the groove. The shorter the caulking tab 3 to be bent, the greater the caulking stroke that is required.

Figure 2:
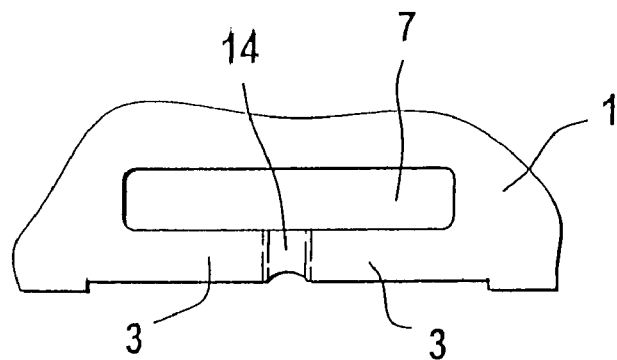
FIG. 2 shows a work piece according to the invention.

FIG. 2 shows a work piece 1 according to the invention. In the work piece 1, the caulking tabs 3 are connected to each other by means of a bridge piece 14. The bridge piece 14, however, has a smaller cross section than the caulking tabs 3 and therefore functions as a desired breaking point. The bridge piece 14 is produced, for example, by scoring the sheet metal part. During the bending of the caulking tabs 3, a more powerful force is required at the beginning because the bridge piece 14 has to be pulled apart. As the bending occurs, the material at the desired breaking point of the bridge piece 14 is stretched thinner. With further deformation, the bridge piece 14 breaks and in the same way as in the prior art, the caulking tabs 3 are bent into a groove 10 of the component 9, toward the side walls 12, and caulked there. The caulking tabs 3 are each longer than in the prior art. The stretched-thin breaking point at the free end 22 of the caulking tab 3, with the taper 20 (FIG. 3b), functions as an assembly bevel.

Figure 3A:
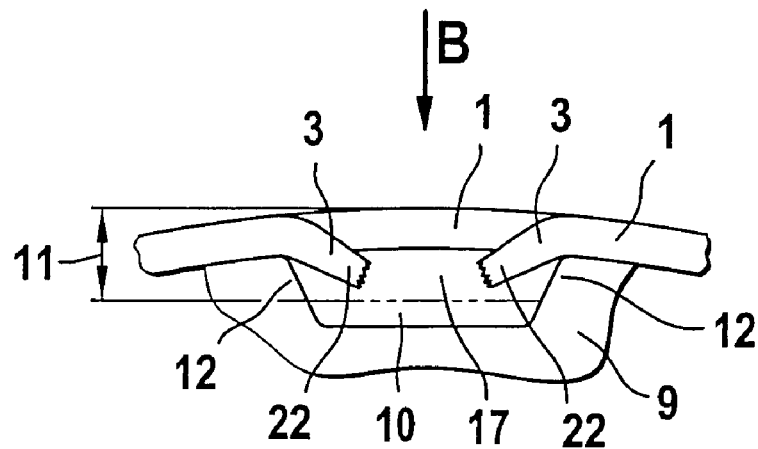
FIG. 3a shows a work piece according to the invention that is caulked to a component.

FIG. 3a shows a work piece 1 according to the invention that rests against a component 9 and is caulked to it. The caulking tabs 3 have been elongated by means of the bridge piece 14 so that a shorter caulking stroke 11 is required in order to produce an overlap with the component 9 comparable to the prior art.

Figure 3B:
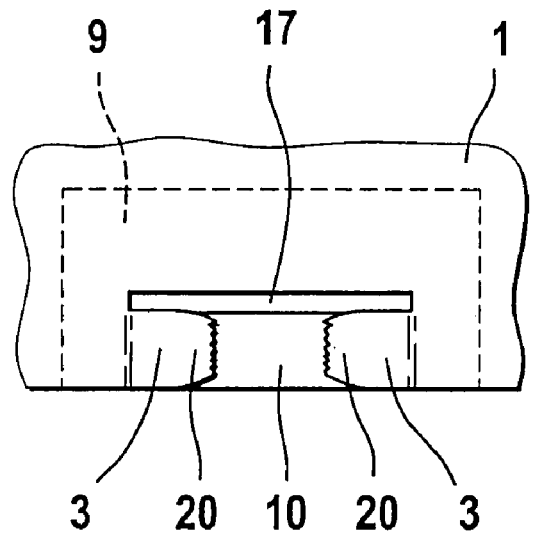

FIG. 3b shows a top view of the work piece 1 and the component 9 in the direction B in FIG. 3a. The component 9 against which the work piece 1 according to the invention rests can be seen in the background. At their free ends 22, the caulking tabs 3 each have a taper 20 that is produced when the bridge piece 14 is stretched thin. At the back wall of the groove 10, the component 9 has, for example, a bevel 17, which is aligned perpendicular to the caulking/bending direction and whose highest part is in the vicinity of the free end 22 of the bent caulking tab 3 so that when the caulking tabs 3 are caulked into the groove 10, a caulking to the component 9 occurs due to the bevel 17. The taper 20 on the caulking tabs 3 permits a favorable transition at the beginning of the caulking process when the caulking tabs 3 are being caulked onto the bevel 17.

The foregoing relates to preferred exemplary embodiments of the invention, it being understood that other variants and embodiments thereof are possible within the spirit and scope of the invention, the latter being defined by the appended claims.

The invention claimed is:

1. In a work piece having two caulking tabs and formed of a plastically deformable material, the improvement wherein the caulking tabs (3) are connected to each other by means of a bridge piece (14), having a smaller cross section than the caulking tabs (3), wherein the bridge piece (14) is dimensioned to be frangible, whereby the bridge piece (14) is broken as the caulking tabs (3) are bent and caulked to a component (9), further comprising a component (9) to be assembled to the work piece resting thereon, the component (9) having a groove (10) into which the caulking tabs (3) are bent, and that the groove (10) having a bevel (17) against which the caulking tabs (3) are slid.

2. The work piece according to claim 1, wherein the work piece (1) is comprised of a sheet metal or a sheet metal laminate.

3. The work piece according to claim 1, wherein the work piece (1) is a pole housing of an electric machine.

4. The work piece according to claim 2, wherein the work piece (1) is a pole housing of an electric machine.

5. In a work piece having two caulking tabs and formed of a plastically deformable material, the improvement wherein the caulking tabs (3) are connected to each other by means of a bridge piece (14), having a smaller cross section than the caulking tabs (3) wherein the bridge piece (14) comprises means defining a desired breaking point which breaks when the caulking tabs (3) are bent, further comprising a component (9) to be assembled to the work piece resting thereon, the component (9) having a groove (10) into which the caulking tabs (3) are bent, and that the groove (10) having a bevel (17) against which the caulking tabs (3) are slid.

6. The work piece according to claim 5, wherein the work piece (1) is comprised of a sheet metal or a sheet metal laminate.

7. The work piece according to claim 6, wherein the work piece (1) is a pole housing of an electric machine.

8. The work piece according to claim 5, wherein the work piece (1) is a pole housing of an electric machine.

9. In a work piece having two caulking tabs and formed of a plastically deformable material, the improvement wherein the caulking tabs (3) are connected to each other by means of a frangible bridge piece (14) having a smaller cross section than the caulking tabs (3), wherein, when the bridge piece (14) is no longer connecting the caulking tabs (3), a free end (22) of each caulking tab is created which (3) has a taper (20) that is partially comprised of material which was formerly part of the bridge piece (14), further comprising a component (9) to be assembled to the work piece resting thereon, the component (9) having a groove (10) into which the caulking tabs (3) are bent, and that the groove (10) having a bevel (17) against which the caulking tabs (3) are slid.

10. The work piece according to claim 9, wherein the work piece (1) is comprised of a sheet metal or a sheet metal laminate.

11. The work piece according to claim 10, wherein the work piece (1) is a pole housing of an electric machine.

12. The work piece according to claim 9, wherein the work piece (1) is a pole housing of an electric machine.

* * * * *